Feb. 4, 1964  A. ERMECKE  3,120,330
LIQUID STORING, DISPENSING AND METERING ARRANGEMENT
Filed Dec. 15, 1961

INVENTOR:
ALBIN ERMECKE
BY
Michael S. Striker
his ATTORNEY

United States Patent Office 3,120,330
Patented Feb. 4, 1964

3,120,330
LIQUID STORING, DISPENSING AND
METERING ARRANGEMENT
Albin Ermecke, Fleckenberg, Sauerland, Germany, assignor to Rich. Ermecke o.H.G., Fleckenberg, Sauerland, Germany
Filed Dec. 15, 1961, Ser. No. 159,657
Claims priority, application Germany Dec. 17, 1960
12 Claims. (Cl. 222—386.5)

The present invention relates to portable vessels for storage of liquids, and more particularly to an arrangement for storing, dispensing and metering of liquids dispensed from bottles and other portable vessels.

As is known, the volume of a liquid drop may change in dependency on the temperature of liquid or surrounding air, as well as in dependency on the viscosity of the liquids. Thus, if one consecutively dispenses groups of say five drops of liquid at a time, this does not necessarily mean that the combined volume of consecutively dispensed groups of drops is always the same because five drops of a liquid which is maintained at a lower temperature may form a liquid body whose volume is different from the combined volume of five drops of the same liquid if the latter is maintained at a higher temperature. Also, five drops of a first liquid or a body whose volume is different from the combined volume of five drops consisting of a different liquid. Therefore a conventional dropper cannot dispense equal quantities of different liquids even though the number of dispensed drops is always the same. Furthermore, counting of drops with a dropper is a tedious and time-consuming operation which requires substantial skill.

An important object of the present invention is to provide a very simple, inexpensive and reliable device for metering liquids dispensed from a bottle or a similar liquid-containing vessel.

Another object of the invention is to provide a metering device of the just outlined characteristics which may be attached to or detached from a vessel so as to permit refilling of the vessel with a liquid substance.

A further object of the invention is to provide a reusable or an expendable metering device which is especially suited for use in pharmacies, households, bars and like establishments, and which is capable of regulating and changing the quantities of consecutively dispensed liquids.

An additional object of the invention is to provide a liquid metering device which may replace conventional droppers utilized by pharmacists for dispensing small quantities of medicines, and which may also serve as a means for dispensing one or more glassfuls of liquids as well as any desired quantities between one or more glassfuls and one or more drops.

Still another object of the invention is to provide a liquid metering device which may be constructed in the form of an attachment and which may be conveniently and rapidly connected with bottles as well as with many other types of liquid-receiving vessels.

A concomitant object of the invention is to provide a liquid storing, dispensing and metering arrangement which may be readily manipulated by persons having little technical skill, such as housewifes, bartenders, pharmacists and others.

A further object of the invention is to provide a liquid storing, dispensing and metering arrangement which will always dispense equal quantities of liquid irrespective of the viscosity or temperature of the liquid.

An additional object of the invention is to provide an arrangement of the above outlined characteristics which will always dispense equal quantities of liquid regardless of the nature of liquid, i.e. the same arrangement may be utilized for dispensing equal quantities of different liquids.

With the above objects in view, the invention resides in the provision of a liquid storing, dispensing and metering arrangement comprising a vessel defining a liquid- and air-containing chamber and having a restricted outlet in the form of a spout or the like. The vessel is normally maintained in a position in which the outlet is located above the level of liquid contained in its internal chamber but the vessel may be tilted or inverted to a position in which the outlet is located below the liquid level so that the liquid tends to flow by gravity through the outlet. The arrangement further comprises a liquid metering device associated with the bottle and defining an internal air-receiving compartment. At least a portion of the wall means bounding the compartment is deformable and this wall means seals the compartment from the liquid-containing chamber of the vessel so that the volume of the chamber increases if the volume of the air-receiving compartment is reduced, and vice versa. The compartment is free to communicate with the atmosphere and its volume is reduced when the vessel assumes its normal position in which the outlet is above the liquid level. However, when the vessel is tilted and the outflowing liquid seals the outlet against entry of atmospheric air, the air entrapped in the internal chamber of the vessel tends to expand and its pressure drops below atmospheric pressure, whereby air penetrating into the compartment of the liquid metering device deforms the wall means in a sense to reduce the volume of the chamber by permitting equal increase in the volume of the compartment until the latter is filled with air. As soon as the compartment cannot increase its volume, the outflow of liquid is terminated in a fully automatic way unless the vessel is returned to its normal upright position and is again tilted to dispense a new metered quantity of liquid. The difference between the minimum and maximum volumes of the compartment equals the quantity of liquid which may be dispensed in response to each tilting of the vessel, and the nature, temperature or viscosity of the liquid cannot affect the operation of the metering device.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 6:
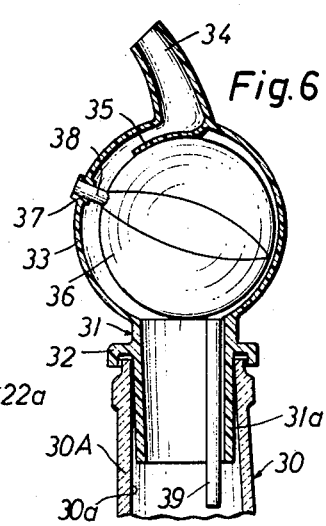
Figure 7:
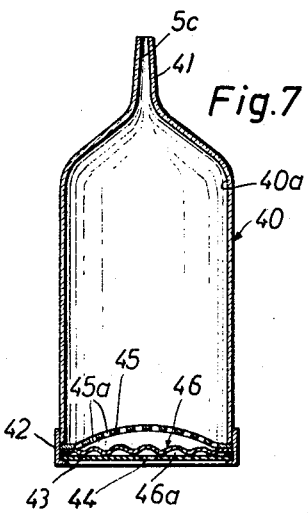

FIG. 6 is a similar fragmentary section through a further arrangement wherein the metering device is mounted in an enlarged hollow portion forming part of a stopper which is connected to the neck portion of the vessel; and FIG. 7 is a central longitudinal section through an additional arrangement including a bottle shaped vessel and a metering device which comprises a deformable wall in the form of a diaphragm sealingly connected to the open lower end portion of the bottle.

Figure 1:
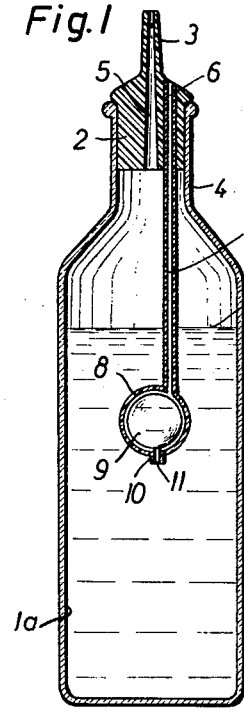
FIG. 1 is a central longitudinal section through a liquid storing, dispensing and metering arrangement which embodies one form of my invention, the arrangement being shown in a position in which the restricted outlet of its air- and liquid-containing vessel is located above the liquid level.

Referring now in greater detail to the illustrated embodiments, and first to FIG. 1, there is shown a combined liquid storing, dispensing and metering arrangement including a vessel in the form of a bottle 1 having a neck-shaped upper portion 4 sealed by a plug or stopper 2 consisting of cork or a like material. This stopper supports a liquid metering device which embodies one form of my invention. As shown, the stopper is provided with a central liquid dispensing and air admitting passage 5 which extends through a restricted outlet in the form of a spout 3 and which tapers outwardly in a direction from the inner end of the stopper toward the discharge end of the spout.

The metering device comprises an elongated pipe 6 which extends through the stopper 2 and which defines a channel 7 for entry of air into a hollow spherical, cylindrical or otherwise configurated housing 8 located in the interior of the air- and liquid-receiving chamber 1a defined by the bottle 1. This housing defines a compartment 8a (see FIG. 2) which accommodates a balloon 9 having a deformable wall separating the compartment 8a from the chamber 1a. The balloon comprises an inlet 11 which communicates with the chamber 1a and which is sealingly received in a nipple 10 of the housing 8. The bottle 1 is assumed to be filled with a liquid, e.g. brandy, up to the level 12.

Figure 2:
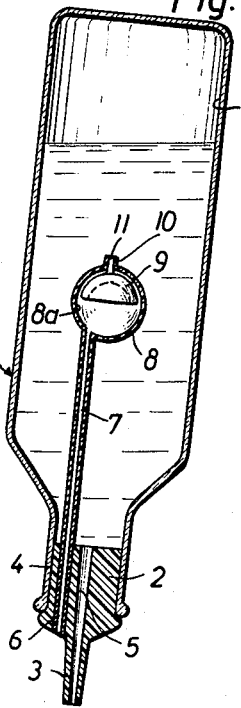
FIG. 2 is a similar central section through the arrangement of FIG. 1, showing the vessel in tilted or inverted position in which the outlet is located below the liquid level.

The arrangement of FIGS. 1 and 2 is utilized as follows:

When the bottle 1 is in its normal upright position as shown in FIG. 1, the liquid contained in its interior penetrates through the inlet 11 and fills the balloon 9 so that the latter expands and assumes a shape determined by the contours of the housing 8. The channel 7 of the pipe 6 connects the compartment 8a with the surrounding atmosphere. The volume of the compartment 8a is reduced and the volume of the chamber 1a is increased accordingly. The pressure of air filling the chamber 1a above the liquid level 12 and the pressure of air in the pipe 6 equal atmospheric pressure.

If the bottle 1 is tilted or inverted to assume the position of FIG. 2, i.e. if the outlet 3 is moved below the liquid level, a predetermined quantity of liquid will be dispensed through the passage 5, and the exact quantity of dispensed liquid will depend on the maximum volume of the compartment 8a. The balloon 9 is compressed and is thereby deformed by atmospheric air which penetrates through the channel 7 and into the interior of the compartment 8a so that liquid contained in the balloon is expelled through the inlet 11 and into the interior of the chamber 1a. Once the interior of the balloon is empty, the flow of liquid through the outlet 3 is terminated and a new metered quantity of liquid can be discharged if the bottle is returned to the position of FIG. 1 and is again tilted to the position of FIG. 2. While the liquid flows through the outlet 3 and while the air flows into the expanding compartment 8a, the volume of the chamber 1a decreases at the same rate at which the volume of the compartment 8a increases. The evacuation of liquid is automatically completed when the compartment 8a is filled with air at atmospheric pressure because any further outflow of liquid would permit the air entrapped in the bottle 1 to expand so that the pressure of entrapped air would drop below atmospheric pressure.

The operation of the improved arrangement is not changed if the liquid level 12 descends below the nipple 10 because the balloon 9 is then filled with air. The pipe 6 and the housing 8 of the metering device may consist of glass, plastic or metal. Of course, the stopper 2, the pipe 6 and the housing 8 may be manufactured as an integral unit consisting of vitreous, metallic or synthetic plastic material. The balloon 9 consists of rubber or elastic synthetic plastic material which forms a fluid tight seal between the chamber 1a and compartment 8a. The inlet 11 of this balloon may be glued to the internal surface of the nipple 10 to insure that atmospheric air filling the channel 7 cannot penetrate into the chamber 1a. The balloon is preferably constructed in such a way that it automatically expands to reduce the volume of the compartment 8a when the bottle 1 is in upright position.

Figure 3:
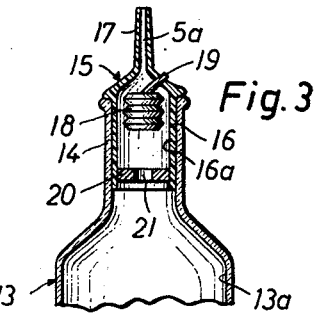
FIG. 3 is a fragmentary central longitudinal section through a modified arrangement in which the liquid metering device is mounted in a hollow stopper received in the neck portion of the vessel, the outlet of the vessel being shown in a position above the liquid level.

FIG. 3 illustrates a different liquid storing dispensing and metering arrangement which includes a liquid metering device provided in the upper portion or neck 14 of a vessel in the form of a bottle 13. This metering device is mounted in a hollow stopper 15 having a tubular neck-sealing portion 16 which is screwed into or is otherwise sealingly received in the neck 14, and a restricted outlet in the form of a spout 17 which defines an outwardly tapering liquid dispensing and air admitting passage 5a. The internal space 16a of the sealing portion 16 accommodates a normally collapsed inflatable and deflatable body in the form of a bellows 18 having an accordion-shaped wall and an inlet conduit 19 which extends through the stopper 15 to permit communication between the surrounding atmosphere and the internal compartment of the bellows 18. The open lower end of the sealing portion 16 receives an axially movable disk 20 having a concentric aperture 21 through which the liquid contained in the bottle 13 may flow toward the passage 5a. For example, the disk 20 may be provided with external threads meshing with internal threads of the sealing portion 16 so that the user may rapidly adjust the position of the disk merely by rotating it with respect to the stopper 15. In the embodiment of FIG. 3, the disk 20 is assumed to be held by friction in the sealing portion 16 so that it may be pushed by a finger or by a suitable tool.

Figure 4:
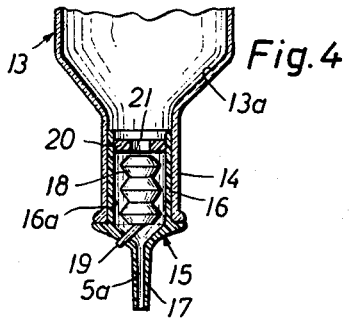
FIG. 4 illustrates the vessel of FIG. 3 in inverted position.

As shown in FIG. 4, the bellows 18 will expand against the force which tends to maintain it in collapsed condition when the bottle 13 is inverted or tilted to move the spout 17 below the liquid level and to dispense a predetermined quantity of liquid through the passage 5a. Again, the capacity of the internal compartment of the expandible bellows determines the quantity of liquid which will be dispensed when the bottle is inverted.

The sealing portion 16 assumes certain functions of the housing 8 shown in FIGS. 1 and 2 by accommodating the bellows 18 and by having an internal space 16a which communicates with the internal chamber 13a of the bottle through the aperture 21.

In the embodiment of FIGS. 3 and 4, the bellows 18 moves into actual abutment with the disk 20 and seals the aperture 21 when the bottle is inverted and after a requisite quantity of liquid was dispensed from the chamber 13a through the spout 17. As soon as the bottle is returned to the normal position of FIG. 3, the bellows 18 collapses because air is free to penetrate through the passage 5a so as to fill the internal space 16a of the sealing portion 16 and to equalize the pressure in the internal compartment of and about the bellows. The bellows preferably collapses in a fully automatic way when the spout 17 is above the level of liquid contained in the chamber 13a.

If the user desires to change the quantity of liquid which is dispensed in inverted position of the bottle 13, he withdraws the sealing portion 16 from the neck 14 and changes the position of the disk 20. If the disk is moved closer to the bellows 18, the quantity of liquid dispensed in response to tilting or inversion of the bottle 13 is reduced because the bellows 18 need not be fully expanded before it can seal the aperture 21.

Figure 5:
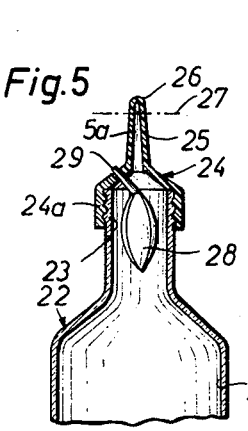
FIG. 5 is a fragmentary central longitudinal section through a different arrangement which comprises a metering device including a star-shaped bellows having a wall consisting of orange peel shaped sections.

FIG. 5 illustrates a somewhat simplified liquid storing, dispensing and metering arrangement including a vessel or bottle 22 provided with a stopper in the form of a cap 24 having an internally threaded portion 24a meshing with external threads on the neck 23 of the bottle 22. The stopper 24 is provided with a spout 25 of easy-to-cut solid material having a sealed tip 26 which may be cut off along the phantom-line 27 to provide a discharge orifice for the liquid contained in the bottle 22. An inflatable and deflatable body in the form of a bellows 28 is accommodated in the neck 23 and comprises an inlet or vent conduit 29 which extends through the wall of the stopper 24 to permit communication between the internal compartment of the bellows and the surrounding atmosphere. When the bottle 22 is in the normal or upright position of FIG. 5, the bellows 28 is collapsed. As shown, the bellows is star-shaped, i.e. its wall consists of orange peel like sections which form a spherical or otherwise configurated body when the bellows is inflated.

The arrangement of FIG. 5 operates as follows:

The stopper 24 is screwed onto the neck 23 and its tip 26 is cut off along the line 27 so that the passage 5b in the spout 25 permits communication of air between the surrounding atmosphere and the internal chamber 22a of the bottle 22 whereby the bellows is automatically deflated and assumes the position of FIG. 5. If the bottle is inverted, a certain quantity of liquid is discharged through the spout 25 and the pressure of air entrapped in the chamber 22a tends to drop below atmospheric pressure so that air penetrating through the conduit 29 inflates the bellows and the inflated bellows may move into sealing contact with the internal surface of the neck 23 to terminate the outflow of liquid. Of course, the outflow of liquid will be terminated even if the bellows does not expand into actual sealing engagement with the neck 23 as soon as the bellows is fully expanded by atmospheric air admitted through the conduit 29. When the bottle is returned to the normal position of FIG. 5, the liquid flows to the bottom and the bellows 28 collapses, whereupon the bottle is ready for the next dispensing operation.

Of course, the bellows 28 may extend into the interior of the bottle 22, i.e. below the neck 23, if it is desired to dispense larger quantities of liquid in response to each tilting or inversion of the bottle. For example, if the bottle 22 of FIG. 5 contains liquor, the dimensions of the bellows 28 may be selected in such a way that the metering device will permit outflow of one or two fluid ounces of liquor when the bottle 22 is inverted. The stopper 24 and the metering device 28, 29 of FIG. 5 may be manufactured as an expendable, cheap throw-away article which is furnished with the bottle and which is discarded once the bottle is empty, though it is obvious that the stopper can be reused as often as desired.

FIG. 6 illustrates a reusable attachment including a stopper 31 and a metering device 36, 38. The stopper 31 comprises an enlarged hollow portion 33 which serves as a means for protecting the inflatable bellows 36 and which is located externally of the neck 30A forming part of the bottle 30. The stopper 31 is provided with an external collar 32 serving as a stop by abutting against the open upper end of the neck 30A. The cylindrical portion 31a of the stopper which extends into the neck 30B is hollow and its internal space communicates with the internal space of the hollow portion 33. The latter is provided with an outlet or spout 34 and with an internal baffle 35 which is adjacent to the intake end of the spout and which deflects the incoming air when the vessel 30 is moved from inverted position to the normal or upright position of FIG. 6. The normally deflated bellows 36 comprises an air admitting conduit 38 which is sealingly received in a nipple 37 forming part of the hollow stopper portion 33 and through which the internal compartment of the bellows may communicate with the surrounding atmosphere. The stopper portion 36 is preferably of spherical shape and may consist of metallic or synthetic plastic material. The internal spaces of the portions 31a, 33 form part of the air- and liquid-receiving chamber 30a in the bottle 30.

It is advisable to provide the stopper 31 with an auxiliary air conducting internal pipe 39 which extends inwardly through the internal space of and beyond the cylindrical portion 31a and whose purpose is to insure steady outflow of liquid by providing a path for the flow of air from the interior of the hollow portion 33 into the internal chamber 30a of the bottle when the latter is tilted so that liquid is permitted to flow through the spout 34. The discharge end of the nipple 34 and the pipe 39 are disposed at opposite sides of the axis of the stopper 31 so that, when the bottle is tilted, the liquid filling the left-hand portion of the stopper, as viewed in FIG. 6, will not obstruct the flow of air from the interior of the hollow portion 33 through the pipe 39 and into the chamber 30a. Furthermore, the air flowing through the pipe 39 increases the pressure against the bellows 36 so that the latter need not be deformed in response to minimal differences in pressures prevailing in the chamber 30a and in the internal compartment of the bellows. Consequently, the walls of the bellows may be thicker and stronger to insure that the attachment 31, 36, 38 of FIG. 6 may be reused as often as desired. This attachment is especially suited for dispensing of comparatively large quantities of liquid, for example, brandy, cognac, liqueur and other types of alcoholic beverages.

FIG. 7 illustrates a further modification of my invention wherein a vessel in the form of a bottle 40 having an outlet or spout 41 is provided with an attachment simultaneously constituting the bottom of the vessel and a liquid metering device. This attachment comprises a concave partition or wall 45 which is provided with apertures or perforations 45a, a deformable intermediate wall in the form of a preferably corrugated flexible diaphragm 46 which is outwardly adjacent to the partition 45, an outer wall 43 which is outwardly adjacent to the diaphragm 46, and a retaining ring 42 which secures the assembly of parts 44—46 to the open lower end portion of the bottle 40. The outer wall 43 is provided with an aperture 44 which permits communication of air between the surrounding atmosphere and the internal compartment 46a defined by the inflatable and deflatable body consisting of the diaphragm 46 and outer wall 44. The edge portions of the components 43, 44, 46 are sealingly pressed against the lower end face of the bottle by the ring 42 so that the lower end portion of the bottle is sealed from atmosphere and the internal chamber 40a of the bottle 40 can communicate with the atmosphere only through the passage 5c of the spout 41.

When the bottle 40 is in the normal position of FIG. 7, the liquid contained in the chamber 40a penetrates through the perforations 45a and fills the space between the partition 45 and the outer wall 43 by deforming the diaphragm 46 into substantial face-to-face abutment with the outer wall. If the bottle 40 is thereupon inverted or tilted so that the liquid contained in the chamber 40a may flow through the spout 41, the pressure in the interior of the bottle tends to drop below atmospheric pressure whereby air is caused to penetrate through the aperture 44 and deforms the diaphragm 46 into abutment with the partition 45 to increase the volume of the compartment 46a at the expense of the chamber 40a. The outflow of liquid is terminated automatically as soon as the air entering through the aperture 44 fills the entire space between the partition 45 and the outer wall 43. The quantity of liquid dispensed during each tilting or inversion of the bottle 40 depends on the diameter of the diaphragm and on the extent to which the partition 45 extends into the interior of the bottle, i.e. on the volume of the space between the partition 45 and outer wall 43 minus the space occupied by the diaphragm 46. The diameter of the diaphragm may be less than the diameter of the outer wall 43 if the arrangement of FIG. 7 is utilized for dispensing comparatively small quantities of liquid. In such instances, the edge portion of the diaphragm may be secured to the upper side of the outer wall 43 inwardly of the ring 42.

The liquid metering devices of my invention may be calibrated so as to permit outflow of different quantities of liquid. For example, if the arrangement of my invention is utilized in a pharmacy, the pharmacist may keep an entire set of bottle attachments one of which will dispense a very small quantity of liquid (e.g. a quantity corresponding to say five drops), another of which will dispense a somewhat larger quantity of liquid (e.g. 10 drops), and so forth. Each attachment may be colored in a different way or the attachments may be provided with readily noticeable identifying symbols or inscriptions to make sure that the user will immediately determine which of a series of attachments should be used for discharging a certain quantity of liquid.

Of course, the liquid metering device of my invention need not always be attached to the open upper end or to the open lower end of a liquid-containing vessel. Thus, the attachment of FIG. 7 may be provided in the upstanding wall of a vessel 40 intermediate its upper and lower ends, and the same applies to the attachments of FIGS. 1–6. Furthermore, the partition 45 and diaphragm 46 of FIG. 7 may be replaced by a bellows of the type shown, for example, in FIG. 5, and the air intake conduit 29 of this bellows is then sealingly received in the aperture 44 of the outer wall 43 which may be integral with the upstanding wall of the vessel 40. The partition 45 and the outer wall 43 may be of convex shape and they may be provided in the lower portion or in any other part of the liquid-containing vessel. The bellows may consist of two deformable disk-shaped diaphragms whose edge portions are sealingly connected to each other. All such modifications are so obvious that they can be readily understood without additional illustrations.

The deformable means 8—9, 18, 28, 36 or 43—46, which define the air-receiving compartments for the arrangement of my invention may be manufactured in any desired size or shape, depending on the quantity of liquid to be dispensed in response to each tilting of the respective vessel. Thus, if the arrangement of my invention is utilized for storing, dispensing and metering of medicines, the internal compartment may be rather small so as to permit outflow of one, two or more drops of a liquid medium. In each of its embodiments, the arrangement comprises a metering device which defines an air-receiving compartment at least partially bounded by a deformable wall portion forming a seal between the compartment and the liquid-containing chamber of the vessel, and the metering device is associated with the vessel in such a way that the volume of its compartment is reduced when the volume of the liquid-containing chamber increases, or vice versa. The deformable wall portion of the metering device permits the compartment to increase its volume in response to expansion of air entrapped in the chamber of the vessel when the latter is tilted so that the liquid seals the outlet, i.e. when the pressure of air in the chamber tends to drop below atmospheric pressure. The volume of liquid dispensed in response to each tilting of the vessel corresponds to the difference between the maximum and minimum volumes of the compartment. It will be noted that, and as shown in FIGS. 1 and 7, the compartment 8a or 46a may be bounded in part by rigid and in part by deformable walls or, and as shown in FIGS. 3, 5 and 6, the compartment may be bounded solely by deformable walls of the bodies 18, 28, 36, respectively.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A liquid storing, dispensing and metering arrangement, comprising a vessel having a main body portion for partly defining an air- and liquid-containing chamber and including restricted outlet means normally located above the level of liquid contained in said chamber, said vessel tiltable to move the outlet means below the liquid level whereby liquid tends to flow by gravity through said outlet means and to entrap air in said chamber; a metering device associated with said vessel for determining the quantity of liquid dispensed through said outlet means in response to each tilting of the vessel, said device defining a compartment and including deformable wall means for separating said compartment from said chamber, and means for communicatively connecting said compartment with the atmosphere, said wall means being extensible and collapsible and constructed and arranged to reduce the volume of said compartment and to correspondingly increase the volume of said chamber when the outlet means is located above the liquid level, and to permit inflowing atmospheric air to increase the volume of said compartment by simultaneous reduction in the volume of said chamber when liquid is dispensed from said chamber in response to tilting of said vessel, the outflow of liquid being terminated simultaneously with termination of inflow of air into said compartment; and limiting means other than said main body portion of said vessel and positioned adjacent said deformable wall means for at least partially limiting the deformation thereof when said deformable wall means is extended.

2. A liquid storing, dispensing and metering arrangement, comprising a vessel having an upper portion and a lower portion and defining an air- and liquid-containing chamber, said upper portion including restricted outlet means normally located above the level of liquid contained in said chamber and said vessel tiltable to move the outlet means below the liquid level whereby liquid tends to flow by gravity through said outlet means and to entrap air in said chamber, said lower portion comprising apertured partitioning means in said chamber; and a metering device connected with the lower portion of said vessel for determining the quantity of liquid dispensed through said outlet means in response to each tilting of the vessel, said device defining a compartment and including a deformable diaphragm outwardly adjacent to said partitioning means for separating said compartment from said chamber, and outer wall means having aperture means for communicatively connecting said compartment with the atmosphere, said diaphragm adjacent to said outer wall means to reduce the volume of said compartment and to correspondingly increase the volume of said chamber when the outlet means is located above the liquid level, and said diaphragm deflected by inflowing atmospheric air against said partitioning means to increase the volume of said compartment by simultaneous reduction of the volume of said chamber when liquid is dispensed from said chamber in response to tilting of said vessel, the outflow of liquid being terminated simultaneously with termination of inflow of air into said compartment.

3. An arrangement as set forth in claim 2, wherein the lower portion of said vessel as an open lower end and said partitioning means is a perforated concave plate mounted in said open end, said diaphragm extending between said outer wall means and said perforated plate.

4. A liquid-storing, dispensing and metering arrangement, comprising a vessel having an upper portion and defining an air- and liquid-containing chamber, said upper portion including restricted outlet means normally located above the level of liquid contained in said chamber and said vessel tiltable to move the outlet means below the liquid level whereby liquid tends to flow by gravity through said outlet means and to entrap air in said chamber; and a metering device mounted in said vessel for determining the quantity of liquid dispensed through said outlet means in response to each tilting of the vessel, said device comprising a housing defining a compartment and including a deformable balloon mounted in said housing for separating said compartment from said chamber, said balloon having inlet means communicating with said chamber, and pipe means for communicatively connecting said compartment with the atmosphere, said balloon inflated by the contents of said chamber to reduce the volume of said compartment and to correspondingly increase the volume of said chamber when the outlet means is located above the liquid level, and said balloon deflated by discharging its contents into said chamber under the pressure of atmospheric air flowing through said pipe means into said compartment to increase the volume of said compartment by simultaneous reduction of the volume of said chamber when liquid is dispensed from said chamber in response to tilting of said vessel, the outflow of liquid being terminated simultaneously with termination of inflow of air into said compartment.

5. An arrangement as set forth in claim 4, wherein said vessel is a bottle having a neck-shaped upper portion and stopper means in said upper portion, said outlet means provided in said stopper means and said pipe means extending through said stopper means and into the chamber of said bottle, said housing suspended on said pipe means and located in said chamber.

6. An arrangement as set forth in claim 5, wherein said housing has a nipple and said inlet means is a hose sealingly received in said nipple.

7. A liquid storing, dispensing and metering arrangement, comprising a vessel having a main portion for forming an air- and liquid-containing chamber and including restricted outlet means normally located above the level of liquid contained in said chamber, said vessel tiltable to move the outlet means below the liquid level whereby liquid tends to flow by gravity through said outlet means and to entrap air in said chamber; a metering device received in said chamber and normally located above said level of liquid but effective for determining the quantity of liquid dispensed through said outlet means in response to each tilting of the vessel, said device comprising an inflatable and deflatable body defining an internal compartment and having deformable wall means separating said compartment from said chamber, and conduit means for communicatively connecting said compartment with the atmosphere, said body being deflated to reduce the volume of said compartment and to correspondingly increase the volume of said chamber when the outlet means is located above the liquid level, and said body being inflated by atmospheric air entering through said conduit means to increase the volume of said compartment by simultaneous reduction of the volume of said chamber when liquid is dispensed from said chamber in response to tilting of said vessel, the outflow of liquid being terminated simultaneously with termination of inflow of air into said compartment and abutment means other than said main portion of said vessel and positioned adjacent said deformable wall means for at least partially limiting the deformation thereof when said body is inflated.

8. An arrangement as set forth in claim 7, wherein said vessel is a bottle having a neck portion and a hollow stopper is connected with said neck portion, said outlet means provided on said stopper and said body at least partially received in the interior of said stopper.

9. An arrangement as set forth in claim 8, wherein said bottle has a longitudinal axis and said stopper comprises an enlarged hollow portion located symmetrically to said longitudinal axis of said bottle and externally of said neck portion, said hollow portion accommodating said body and comprising internal baffle means between said outlet means and said body.

10. An arrangement as set forth in claim 8, wherein said stopper includes a hollow sealing portion of cylindrical shape which is received in said neck portion and accommodates said body, said abutment means comprising an apertured disk axially movably received in said sealing portion so as to determine maximum inflation of said body and to thereby regulate the quantities of liquid dispensed in response to each tilting of said vessel.

11. A liquid storing, dispensing and metering arrangement, comprising a vessel having a main portion for forming an air- and liquid-containing chamber and including restricted outlet means normally located above the level of liquid contained in said chamber, said vessel tiltable to move the outlet means below the liquid level whereby liquid tends to flow by gravity through said outlet means and to entrap air in said chamber; a metering device associated with said vessel for determining the quantity of liquid dispensed through said outlet means in response to each tilting of the vessel, said device defining a compartment and including deformable wall means for separating said compartment from said chamber, and means for communicatively connecting said compartment with the atmosphere, said wall means being extensible and collapsible and constructed and arranged to reduce the volume of said compartment and to correspondingly increase the volume of said chamber when the outlet means is located above the liquid level, and to permit inflowing atmospheric air to increase the volume of said compartment by simultaneous reduction of the volume of said chamber when liquid is dispensed from said chamber in response to tilting of said vessel, the outflow of liquid being terminated simultaneously with termination of inflow of air into said compartment; and positive limiting means other than said main portion of said vessel and positioned adjacent said deformable wall means for at least partially limiting the deformation thereof when said deformable wall means is extended, said positive limiting means including control means for regulating the extent to which said wall means may reduce the volume of said chamber, whereby the quantities of liquid dispensed in response to each tilting of said vessel may be varied.

12. A liquid storing, dispensing and metering arrangement, comprising a vessel having a main body portion for at least partially defining an air- and liquid-containing chamber and having an open upper portion; a stopper sealingly connected to said upper portion and comprising outlet means of easy-to-cut solid material, said outlet means having a restricted passage and a tip portion for sealing said passage, said tip portion separable from said outlet means to permit outflow of liquid and inflow of air through said passage, said passage normally located above the level of liquid contained in said chamber and said vessel tiltable to move said passage below the liquid level whereby liquid tends to flow by gravity through said passage and to entrap air in said chamber; a metering device associated with said vessel for determining the quantity of liquid dispensed through said passage in response to each tilting of the vessel, said device defining a compartment and including deformable wall means for separating said compartment from said chamber, and means for communicatively connecting said compartment with the atmosphere, said wall means being extensible and collapsible and constructed and arranged to reduce the volume of said compartment and to correspondingly increase the volume of said chamber when the passage is located above the liquid level, and to permit inflowing atmospheric air to increase the volume of said compartment by simultaneous reduction in the volume of said chamber when liquid is dispensed from said chamber in response to tilting of said vessel, the outflow of liquid being terminated simultaneously with termination of inflow of air into said compartment; and limiting means other than said main body portion of said vessel and positioned adjacent said deformable wall means for at least partially limiting the deformation thereof when said deformable wall means is extended.

References Cited in the file of this patent
UNITED STATES PATENTS
2,673,013    Hester _____ Mar. 23, 1954